US 6,654,362 B1

(12) United States Patent
Palamara

(10) Patent No.: US 6,654,362 B1
(45) Date of Patent: Nov. 25, 2003

(54) USE OF LOCATION IN HANDOFF IN WIRELESS COMMUNICATION SYSTEMS

(75) Inventor: Maria E. Palamara, Denville, NJ (US)

(73) Assignee: Lucent Technologies, Inc., Murray Hill, CA (US)

( * ) Notice: Subject to any disclaimer, the term of this patent is extended or adjusted under 35 U.S.C. 154(b) by 0 days.

(21) Appl. No.: 09/448,809

(22) Filed: Nov. 24, 1999

(51) Int. Cl.[7] .................................................. H04Q 7/00
(52) U.S. Cl. ........................ 370/332; 455/437; 455/440
(58) Field of Search ................................ 370/331–334; 455/436–444, 456, 457, 552, 553, 432, 435

(56) References Cited

U.S. PATENT DOCUMENTS

| | | | |
|---|---|---|---|
| 4,556,760 A | 12/1985 | Goldman | 455/56 |
| 5,235,633 A | 8/1993 | Dennison | 379/60 |
| 5,343,512 A | 8/1994 | Wang et al. | 379/59 |
| 5,390,339 A | 2/1995 | Bruckert | 455/33.2 |
| 5,432,842 A | 7/1995 | Kinoshita et al. | 379/60 |
| 5,546,445 A | 8/1996 | Dennison et al. | 379/60 |
| 5,590,177 A | 12/1996 | Vilmur et al. | 370/60 |
| 5,634,206 A | 5/1997 | Reed et al. | 455/277.1 |
| 5,642,353 A | 6/1997 | Roy et al. | 370/329 |
| 5,926,761 A | 7/1999 | Reed et al. | 455/440 |
| 5,940,761 A | 8/1999 | Tiedemann et al. | 455/437 |
| 5,946,611 A | 8/1999 | Dennison et al. | 455/404 |
| 5,978,679 A * | 11/1999 | Agre | 455/442 |
| 5,999,816 A | 12/1999 | Tiedemann et al. | 455/437 |
| 6,014,561 A * | 1/2000 | Molne | 455/419 |
| 6,038,444 A | 3/2000 | Schipper et al. | 455/421 |
| 6,085,091 A | 7/2000 | Yoo et al. | 455/441 |
| 6,137,840 A | 10/2000 | Tiedemann et al. | 375/297 |
| 6,141,565 A | 10/2000 | Feuerstein et al. | 455/560 |
| 6,157,835 A * | 12/2000 | Findikli et al. | 455/436 |
| 6,321,090 B1 * | 11/2001 | Soliman | 455/440 |

FOREIGN PATENT DOCUMENTS

JP         09261711 A         10/1997

OTHER PUBLICATIONS

M–H. Chiu et al., "Predictive Schemes For Handoff Prioritization in Cellular Networks Based On Mobile Positioning", *IEEE Journal On Selected Areas In Comm.*, vol. 18, No. 3, Mar. 2000, pp. 510–522.

(List continued on next page.)

*Primary Examiner*—Nguyen T. Vo
*Assistant Examiner*—Tracy M. Legree

(57) ABSTRACT

A method and apparatus that uses the location of a mobile terminal to direct the mobile terminal to a candidate receiver for participation in a handoff of the mobile terminal. The location of the mobile terminal in communication with a first receiver is determined. It is also determined whether the mobile terminal should participate in a handoff. The later can be determined based on the location of the mobile terminal, or it can be determined in any other way. If mobile terminal should participate in the handoff, the location of the mobile terminal is used to direct the mobile terminal to a candidate receiver for participation in the handoff. The characteristics of the candidate receiver and/or transmitter can be obtained from a database that correlates the location of the mobile terminal and the characteristics of the candidate receiver and/or candidate transmitter. The mobile terminal can then be handed off to the candidate receiver. Optionally, the mobile terminal can then perform measurements of the wireless communication system using the candidate receiver, and then be handed off to the first receiver. An optimal receiver for participation in the handoff is identified based on the measurements of the wireless communication system. The mobile terminal is then handed off to the optimal receiver. Using the location of the mobile terminal to direct it to the candidate receiver for participation in the handoff is particularly advantageous for two adjacent or overlapping wireless communication systems that operate at different frequency bands, or comply with different wireless communication standards, or both.

24 Claims, 2 Drawing Sheets

OTHER PUBLICATIONS

L. Hsu et al., "Maintaining Quality Of Service (QoS) during Handoff In Cellular System With Movement Prediction Schemes", *IEEE VTS 50th Vehicular Tech. Conf.*, NJ, 1999, pp. 2153–2157.

R. Sankar et al., "A Combined Prediction System For Handoffs In Overlaid Wireless Networks", *1999 IEEE International Conf. On Comm.* vol. 2, pp. 760–764.

W–S. Soh et al., "Dynamic Bandwidth Reservation In Hierarchical Wireless ATM Networks Using GPS–Based Prediction", *IEEE VTS 50thy Vehicular Technology Conf.*, 1999, vol. 1, pp. 528–532.

N. Savkoor et al., "Microcellular Handoff Control Using Robust Prediction Techniques", *Proceedings IEEE Southeastcon'99*, pp. 337–339.

H–G Jeon et al., "A Call Control Scheme For Soft Handoff In CDMA Cellular Systems", *ICC'98 IEEE International Conf. On Comm.*, vol. 2, 1998, pp. 999–1003.

G.N. Senarath et al., "Controlling Handoff Performance using Signal Strength Prediction Schemes & Hysteresis Algorithms For Different Shadowing Envirtonments", *1996 IEEE 46th Vehicular Techn. Conf.* vol. 3, pp. 1510–15154.

G.N. Senarath et al., "Reduction Of Call Drop–outs During Handoffs Using Efficient Signal Strength Prediction Algorithms For Personal Communication System", GLOBECOM '95 IEEE, 1995, pp. 2308–2312.

M.D. Austin et al., "Cochannel Interfrence Modelling For Signal Strength Based Handoff Analysis", *Electronics Letters*, Nov. 10, 1994, vol. 30, No. 23, pp. 1914–1915.

D. Munoz–Rodriguez et al., "Multi–Threshold And Signal Trend Forecasting Algorithms For Hand–Off In Cellular Communications", *European Transactions on Telecommunications and Related Technologies*, Jul.–Aug. 1990, vol. 1, No. 4, pp. 465–469.

* cited by examiner

USE OF LOCATION IN HANDOFF IN WIRELESS COMMUNICATION SYSTEMS

BACKGROUND OF THE INVENTION

1. Field of the Invention

The present invention relates generally to wireless communication systems and, in particular, to handoff in wireless communication systems.

2. Description of the Related Art

The operation of wireless communication systems is in large part defined by industry standards. These standards specify the air interface specification that allows a mobile terminal to communicate with a base station. The air interface specification typically includes a set of air interface channels, channel signal encoding rules, and signaling messages to allow the mobile terminal to communicate with the base station. The standards include standards for Advanced Mobile Phone Service (AMPS), Time Division Multiple Access (TDMA), Code Division Multiple Access (CDMA), Global System for Mobile (GSM) technologies. The rapid pace of development in wireless communication systems has typically led to multiple standards within some of the technologies, such as CDMA. For example, some of the standards in CDMA technology include IS-95, CDMA 2000, wideband CDMA, and Universal Mobile Telecommunication System (UMTS).

A particular wireless communication system will comply with one, or possibly several, standards. For example, many wireless communication systems that comply with either one of the CDMA standards or one of the TDMA standards are designed to also comply with the AMPS standards. Systems that comply with more than one standard maximize geographic coverage for users since these systems allow a user who is capable of using either standard to use the wireless communication system.

A wireless communication system usually serves a specific limited geographic area and operates over a particular frequency band. The frequency band is assigned by the FCC for a particular geographic area. The geographic area served by one wireless communication system will typically border on, or overlap, with the geographic area served by another wireless communication system. In the case of adjacent wireless communication systems, the systems may operate either over the same or over different frequency bands, and may comply with either the same or with different standards. In the case of two overlapping wireless communication systems, the systems will operate over different frequency bands, and may comply with the either the same or with different standards.

FIG. 1 illustrates two wireless communication systems, wireless communication system 100, and wireless communication system 200. The geographic areas serviced by wireless communication systems 100 and 200 are divided into a plurality of spatially distinct areas called "cells," 102 and 104, and 202, respectively. Although cells 102, 104, and 202 are illustrated as a hexagon in a honeycomb pattern, each cell is actually of an irregular shape that depends on the topography of the terrain surrounding the cell. Although there are only two cell shown for wireless communication system 100 and one cell shown for wireless communication system 200, one skilled in the art will appreciate that each wireless communication system typically has a much larger number of cells. Each cell 102, 104, 202 contains one base station 112, 114, and 212, respectively. Base stations 112 and 114 include equipment to communicate with Mobile Switching Center ("MSC") 120, which is connected to local and/or long-distance transmission network 122, such as a public switch telephone network (PSTN). Base station 212 includes equipment to communicate with Mobile Switching Center ("MSC") 220, which is connected to local and/or long-distance transmission network 222, such as a public switch telephone network (PSTN). Each base station 112, 114, and 212 also includes antennas and radios, which include a receiver and transmitter. The base stations use the antennas and radios to communicate with mobile terminals 124, 126.

When a call is set up in wireless communication system 100, mobile terminal 124 communicates with the base station from which mobile terminal 124 receives the strongest signal, in this case base station 112. As mobile terminal 124 moves from one cell to another, continuous service is provided by "handing off" mobile terminal 124 from the base station in cell where the mobile terminal is located to the base station in the cell into which the mobile terminal is moving. Based on measurements of signals sent to and received from mobile terminal 124, base station 112 determines the best base station with which it can participate in a handoff of mobile terminal 124, referred to herein as a handoff candidate. The receiver and transmitter of the handoff candidate are referred to herein as the candidate receiver and the candidate transmitter, respectively. In CDMA systems, base station 112 starts the process of searching for a handoff candidate when the signal received by mobile terminal 124 from base station 112 falls below a certain threshold. The mobile terminal is continuously measuring the pilot signals from base stations in adjacent cells. Base station 112 then analyzes these signal measurements to determine the handoff candidate. In AMPS and in some TDMA systems, base station 112 starts the process of searching for a handoff candidate when the signal received by the base station from the mobile terminal falls below a certain threshold. Base station 112 searches for a handoff candidate by analyzing the signals from base stations in adjacent cells. The base station requests the base stations in adjacent cells to measure the signals received by them from mobile terminal 124. Base station 112 then analyzes these signals to determine the handoff candidate. In TDMA systems that have mobile assisted handoff, both the signal received by the base station from the mobile terminal and the signal received by the mobile terminal to the base station is used to determine when the base station starts the process of searching for a handoff candidate.

A problem occurs when mobile terminal 124 may need to be handed off between two wireless communication systems. For example, when base station 112 is in a cell on the edge of wireless communication system 100, such as cell 102, and wireless communication system 200 either does not operate over the same frequency band, and/or does not comply with the same standard as wireless communication system 100. This is a problem because before mobile terminal 124 can be handed off, the mobile terminal needs to communicate with a base station in wireless communication system 200 and determine the characteristics and environment in wireless communication system 200. In order to communicate with a base station in wireless system 200, mobile terminal 124 needs to switch to operate in the same frequency band as communication system 200. Mobile terminal 124 also needs to switch to comply with the standard with which wireless communication system 200 complies. The mobile terminal then needs to communicate with base station 212. Since mobile terminal 124 is not aware of the characteristics of base station 212, it takes mobile terminal 124 a significant amount of time to establish communication with base station 212. For, example, when both wireless communication systems 100 and 200 comply with a CDMA standard, mobile terminal 124 needs to: switch to the appropriate frequency for wireless communication system 200; locate and synch to the pilot signal from base station 212; and register with and be authenticated by wireless communication system 200. During this time, mobile terminal 124 cannot communicate with base station 112 because base station 112 operates in a different frequency band and/or complies with a different standard. The significant amount of time required to perform the handoff may result in the call being dropped, or in the user of mobile terminal 124 hearing noise or silence, which is a disruption of the call and an inconvenience to the user.

Accordingly, there exists a need for quickly performing a handoff with a base station in one wireless communication system and a base station in another wireless communication system.

SUMMARY OF THE INVENTION

The invention solves the above problems by using the location of a mobile terminal to direct the mobile terminal to a candidate receiver for participation in a handoff of the mobile terminal. The location of the mobile terminal in communication with a first receiver is determined. The location of the mobile terminal can be determined in any way. For example, the location of the mobile terminal can be determined using a time difference of arrival triangulation, a global position system (GPS), or a wireless assisted global position system. It is also determined whether the mobile terminal should participate in a handoff. Whether the mobile terminal should participate in the handoff can be based on the location of the mobile terminal. Alternatively, this can be based on any method of determining whether the mobile terminal should participate in the handoff, such as by measuring a signal strength of a signal received by or sent by the mobile terminal and comparing the signal strength to a threshold signal strength. When location is not used to determine whether the mobile terminal should participate in a handoff, the steps of determining the location of the mobile terminal and whether the mobile terminal should participate in a handoff can be reversed.

If the mobile terminal should participate in the handoff, the mobile terminal is directed to the candidate receiver for participation in the handoff using the location of the mobile terminal. The candidate receiver can be identified by: 1) accessing the location of the mobile terminal within the wireless communication system in an index, such as a database or a lookup table, where the index correlates the location within the wireless communication system and one or more candidate receivers for participating in the handoff with the first receiver; and 2) obtaining the candidate receiver from the index. The candidate receiver then participates in the handoff of the mobile terminal, thereby allowing the mobile terminal to communicate with the candidate receiver.

In an embodiment of the invention, directing the mobile terminal to the candidate receiver includes providing the mobile terminal at least one characteristic of the candidate receiver and/or transmitter, referred to herein as the candidate transceiver. The characteristic is preferably an RF communication characteristic that enables communication between the mobile terminal and the candidate receiver and candidate transmitter.

In one embodiment of the invention, the mobile terminal then performs measurements of the wireless communication system using the candidate receiver. The first receiver then participates in a handoff of the mobile terminal. An optimal receiver for participation in the handoff is identified based on the measurements of the wireless communication system that the mobile terminal obtained when it was communicating with the candidate receiver. The optimal receiver can be identified by either the mobile terminal or the base station containing the first receiver. The optimal receiver then participates in a handoff of the mobile terminal.

Identifying the candidate receiver for participation in the handoff using the location of the mobile terminal is particularly advantageous when: 1) the first receiver operates with a first frequency band, and the cell, in which the first receiver is located, borders at least one other cell having a receiver that operates at a second frequency band; 2) the first receiver complies with a first wireless communication standard, and the cell, in which the first receiver is located, borders at least one other cell having a receiver that complies with a second wireless communication standard; or 3) both one and two. For example, when the first receiver complies with a CDMA standard and the candidate receiver complies with AMPS, or TDMA, or GSM; when the first receiver complies with a GSM standard and the candidate receiver complies with AMPS or TDMA; when the first receiver complies with IS-95 CDMA and the candidate receiver complies with a wideband CDMA standard; or when the first receiver operates within frequency band A and the candidate receiver operates within frequency band B.

DETAILED DESCRIPTION

Figure 1:
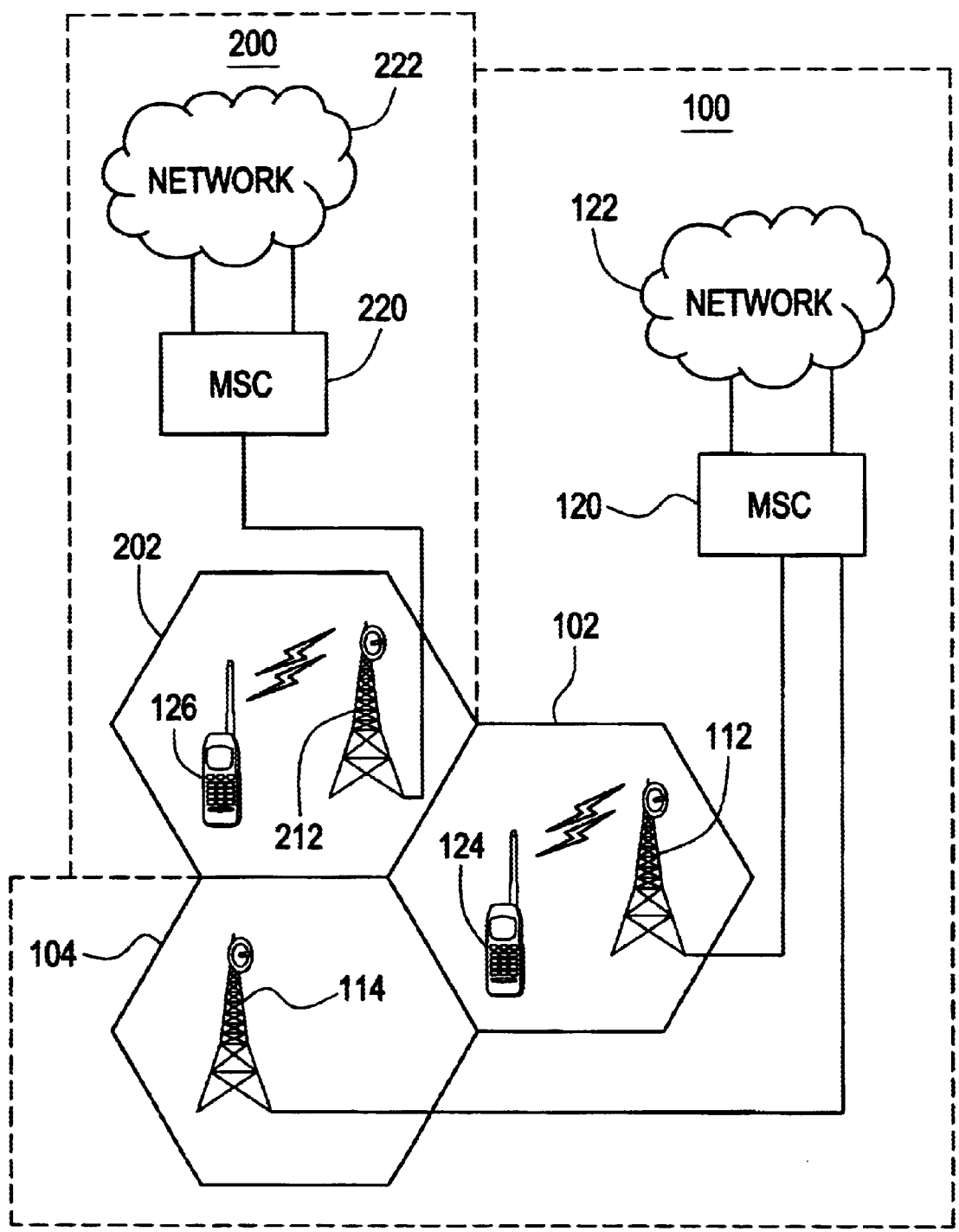
FIG. 1 is a block diagram of a portion of two wireless communication systems.
Figure 2:
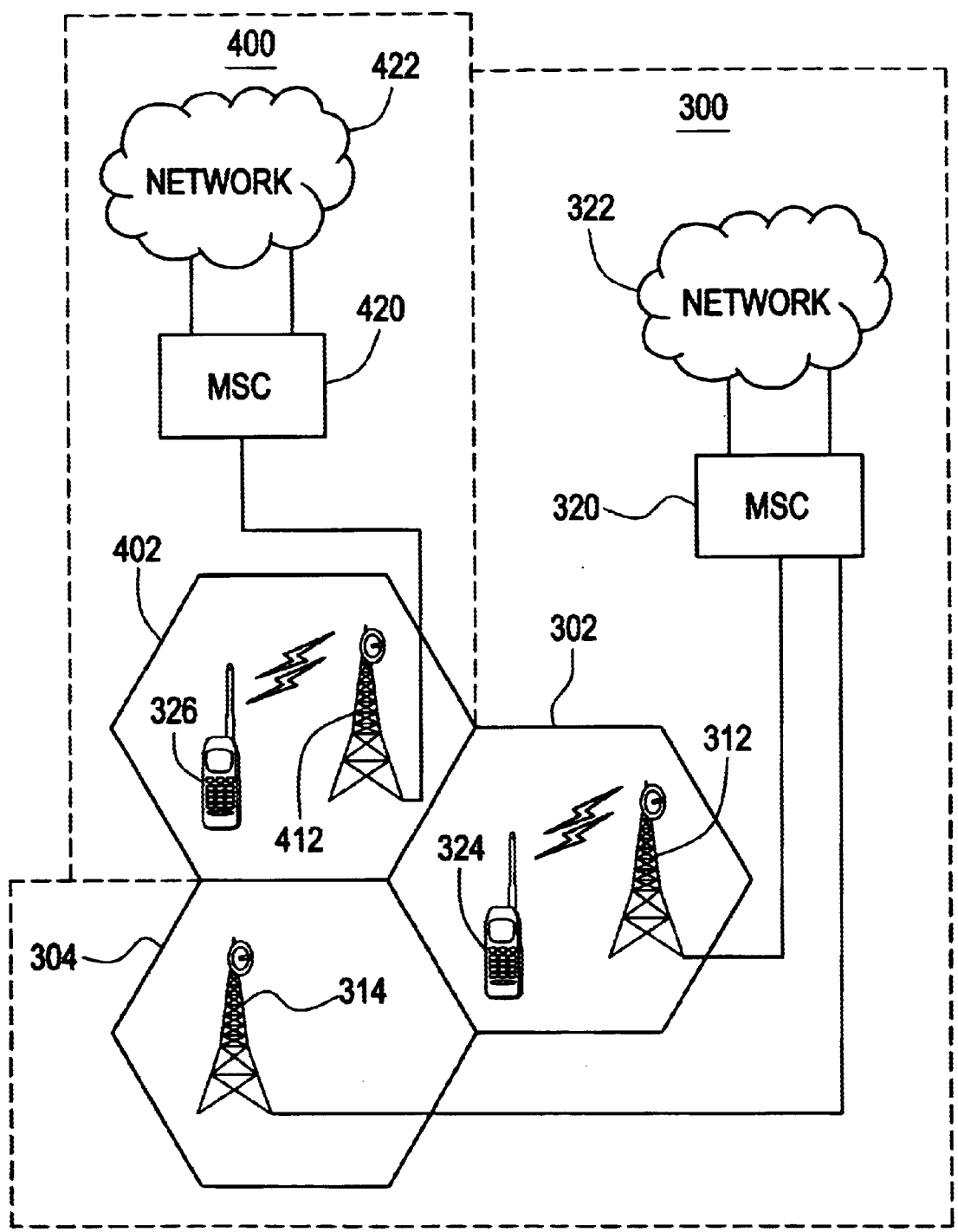
FIG. 2 is a block diagram of a portion of two wireless communications systems where a candidate receiver for a handoff of a mobile terminal can be identified from the location of the mobile terminal, where the mobile terminal is in communication with a first terminal.

FIG. 2 illustrates a CDMA system 300 operating in frequency band A that complies with IS-95 CDMA standards, and CDMA system 400 that operates in frequency band B that complies with the CDMA 2000 standard. Although the embodiment of the invention is being illustrated with the use of CDMA systems, the invention is not limited to use in CDMA systems. The invention may be equally applicable to any wireless communication system capable of handoff.

The geographic areas serviced by wireless communication systems 300 and 400 are divided into a plurality of spatially distinct areas called "cells," 302 and 304, and 402, respectively. Although cells 302, 304, and 402 are illustrated as a hexagon in a honeycomb pattern, each cell is actually of an irregular shape that depends on the topography of the terrain surrounding the cell. Although there are only two cells shown for wireless communication system 300 and one cell shown for wireless communication system 400, one skilled in the art will appreciate that each wireless communication system typically has a much larger number of cells. Each cell 302, 304, 402 contains one base station 312, 314, and 412, respectively. Base stations 312 and 314 include equipment to communicate with Mobile Switching Center ("MSC") 320, which is connected to local and/or long-distance transmission network 322, such as a public switch telephone network (PSTN). Base station 412 includes equipment to communicate with Mobile Switching Center ("MSC") 420, which is connected to local and/or long-distance transmission network 422, such as a public switch telephone network (PSTN). Each base station 312, 314, and 412 also includes antennas and radios, which include a receiver and transmitter. The base station uses the antennas and radios to communicate with mobile terminals 324, 326.

When a call is set up in CDMA system 300, mobile terminal 324 communicates with the base station from which mobile terminal 324 receives the strongest signal, in this case base station 312. Mobile terminal 324 communicates with the receiver and transmitter of base station 312.

In one embodiment of the invention, the location of mobile terminal 324 is periodically determined, as described below. Base station 312 access the location of the mobile terminal in a handoff index, such as a handoff database or a handoff lookup table. The handoff index correlates locations within CDMA system 300 and whether a mobile terminal should participate in a handoff. Preferably, the handoff index is populated with information obtained by "driving the network," which includes, system technicians driving through the network tracking RF call trace data at particular locations. Typically, the locations are described in terms of latitude and longitude, although they can be described in any convenient manner. The RF call trace data measurements are preferably taken at every 50-ft., although they be taken at shorter or longer intervals of distance. The latitude and longitude coordinates of the locations where the measurements are taken are correlated with whether a mobile terminal at the location should participate in a handoff, which as described below is based on the measurements. When the actual location of the mobile terminal is not at one of these stored locations, then the closest location to the actual location is accessed in the index. The closest location is determined based on a straight-line distance between the actual location and the stored locations.

Driving the network is typically performed when the wireless communication system is first tested. Driving the network can also be repeated periodically once the system is operating, at which time the handoff index can be updated. It can be repeated either for the entire wireless communication system or for a portion of the wireless communication system. The call trace data can also be either originally obtained or updated by periodically getting call trace data from mobile terminals instead of by driving the network.

The call trace data at a particular location indicates the strength of the signal from the base station to the mobile terminal at the location. This indication is analyzed to determine whether a handoff is warranted when mobile terminal 324 is at this location. This indication is stored in the handoff index. For example, the strength of the signal from the base station to this location can be analyzed, and if the strength is below a handoff threshold, then in the handoff index associated with this location there is an indication that a handoff should be initiated.

The location of mobile terminal 324 can be determined in any known way. For example, the location of the mobile terminal can be determined using a time difference of arrival triangulation, a global position system (GPS), or a wireless assisted global position system. In time difference of arrival triangulation, the mobile terminal transmits a signal to three base stations. Each of the three base station determines the circle where the mobile terminal can be located with respect to that base station based on the time of arrival of the signal, the time-the signal left the mobile terminal and the speed with which the signal travels. Alternatively, the mobile terminal can receive a signal from each of three base stations. The time difference of arrival between signals from each pair of base stations is used to determine a hyperbola on which the mobile is located. The intersection of two hyperbolas is the location of the mobile terminal. These calculations can be performed either by the mobile terminal, or by one of the base stations. In the later case, the mobile terminal should send the measurement of the time of arrival of the signal from the three base stations to the one base station that will perform the calculations.

In GPS, a satellite is used to determine the position of the mobile terminal. GPS comprises a plurality of satellites and at least one GPS receiver. Each satellite orbits the earth at a known speed and at a known distance apart from the other satellites. Each satellite transmits a GPS signal which includes: a carrier signal with a known frequency modulated using a unique pseudo-random noise (PN) code navigational data associated with the particular satellite, and timing information and orbital data, such as elevation angle and azimuth angle. The GPS receiver in the mobile terminal can use this information to determine the location of the mobile terminal.

In wireless assisted global position system, an external GPS receiver, located within wireless communication 100 but outside the mobile terminal, can be used to obtain the offset of the GPS signal. There can be one external GPS receiver for each base station, or for each group of base stations, or for the entire wireless communication system. After the GPS receiver obtains the offset of the GPS signal the offset it transmitted to the base station communicating with the mobile terminal, where the offset is used to determine a window within which a particular part of the PN code will be transmitted. This window is adjusted to compensate for the distance between the external GPS receiver and the mobile terminal. The adjusted window is then transmitted to the mobile terminal. The mobile terminal is equipped with a partial or a full GPS receiver. The mobile terminal uses the adjusted window to synchronize with the GPS signal more quickly. The mobile terminal uses the information obtained from the GPS signal to determine its location.

As described above, it is determined whether mobile terminal should participate in a handoff. In one embodiment of the invention, if mobile terminal 324 should participate in the handoff, the candidate receiver for participation in the handoff is identified using the location of the mobile terminal. The location of the mobile terminal within the wireless communication system is accessed in a candidate receiver index, such as a candidate receiver database or a candidate receiver lookup table. The candidate receiver index correlates the location within the wireless communication system and one or more candidate receivers for participating in the handoff with the first receiver. Preferably, the candidate receiver index is also populated with the information obtained by driving the system, as described above. The call trace data is then analyzed to determine which sector of which base station sends the strongest signals to the mobile terminal at a particular location. The receiver of that sector is then associated with the particular location in the receiver index. The sector can be in either wireless communication system 100 and 200. The latitude and longitude coordinates of the locations where the call trace data is measured are correlated with the candidate receiver for the mobile terminal at the location. When the actual location of the mobile terminal is not at one of these stored locations, then the closest location closest to the actual location is accessed in the index. The closest location is determined based on straight-line distance between the actual location and the stored locations.

The candidate receiver is obtained from the candidate receiver index. In this case, base station 412 contains the candidate receiver. Base station 412 then participates with base station 312 in the handoff of mobile terminal 324. Mobile terminal 324 can then communicate with the candidate receiver.

Preferably, the wireless communication system also has a characteristic index, such as characteristic database or characteristic lookup table. The characteristic index correlates the candidate receiver and at least one of the characteristics of the candidate receiver and/or a corresponding transmitter, referred to herein as a candidate transmitter. The candidate receiver and/or candidate transmitter is referred to herein and a candidate transceiver. Preferably, the characteristics of the candidate transceiver include the characteristics of both the candidate receiver and candidate transmitter, although characteristics of the candidate transceiver may include the characteristics of just the candidate receiver or the candidate transmitter. These characteristics should allow a mobile terminal to quickly communicate with the candidate receiver and candidate transmitter. These characteristics include the code for the pilot of the candidate transmitter, the signal strengths of the candidate transmitter, the pilot code offset of the candidate transmitter, and the frequency at which the candidate transmitter and receiver operate, as well as any other characteristics that would allow the mobile terminal to quickly communicate with the candidate receiver and/or candidate transmitter. The characteristic of the candidate receiver and transmitter are obtained from the characteristic index and transmitted to mobile terminal 324 to allow mobile terminal 324 to easily and quickly set up communication with the candidate receiver and transmitter. The characteristic index for the locations in wireless communication system 300 can be populated with information obtained from wireless communication system 300, and the characteristic index for the locations in wireless communication system 400 can be populated with information obtained from wireless communication system 400. The characteristic index for locations within wireless communication system 300 should be available in wireless communication system 400, and vice versa. This can be accomplished in any manner. For example, a copy of the characteristic index of one wireless communication system can be provided to and stored in the other wireless communication system. Alternatively, one wireless communication system can be allowed to accesses the characteristic index stored in the other wireless communication system.

In another embodiment of the invention, instead of, or in addition to, correlating the candidate receiver and at least one of the characteristics of the candidate transceiver, the characteristic index can correlate the location of the mobile terminal with the characteristic of the candidate transceiver that would correlate to the location. In this case, the characteristic index can be populated similarly to the candidate receiver index, i.e. call trace data is obtained and analyzed to determine which sector of which base station sends the strongest signals to the mobile terminal at a particular location. However, instead of storing the receiver of this sector in the index, as described above, the characteristics of the receiver and transmitter are stored in the index. The characteristics of the receiver and transmitter typically effectively direct the mobile terminal to the candidate receiver.

Preferably, the handoff index, the candidate receiver index, and the characteristic index are combined into one index that correlates the location within the wireless communication system with 1) whether a mobile terminal at the location should participate in a handoff, and 2) the candidate receiver for the handoff, and 3) the characteristic of the candidate receiver and the corresponding candidate transmitter. The index is stored in a memory accessible by many base stations, such as a memory within the MSC or within the network. This would allow easy access by many base stations while conserving memory. However, the index can be stored at each base station, which would allow quicker access to the index. Optionally, only a portion of the index that contains the locations within a particular vicinity of the base station can be stored in at each base station. For example, a portion of the index that contains locations within the cell containing a particular base station can be stored at the particular base station. In another example, the portion of the index stored at a particular base station can also contain locations within the cells adjacent to the cell containing the particular base station.

When the handoff index, the candidate receiver index, and the characteristic index are not combined into one index, each of the indexes can be stored in a memory accessible by many base stations or at each base station. The three indexes do not need to be stored in the same location.

Once mobile terminal 324 is handed off to the candidate receiver and transmitter in base station 412, the mobile terminal can resume normal operation. Alternatively, in one embodiment of the invention, mobile terminal 324 can then perform measurements of wireless communication system 400 using the candidate receiver and candidate transmitter. Mobile terminal 324 can then be handed off back to the receiver and transmitter in base station 312. An optimal receiver for participation in the handoff is identified based on the measurements of the wireless communication system 400. Either mobile terminal 324 or base station 312 can identify the optimal receiver. The optimal receiver then participates in a handoff of mobile terminal 324.

The foregoing is merely illustrative. Thus, for example, in the illustrative embodiment the location of the mobile terminal is periodically determined and used to determine whether the mobile terminal should participate in a handoff. In an alternative embodiment of the invention, whether the mobile terminal should participate in the handoff can be based on any method of determining whether the mobile terminal should participate in the handoff. For example, the signal strength of a signal received by mobile terminal 324 from base station 312 can be measured and compared to a threshold signal strength. When the signal strength falls below a certain threshold, base station 312 starts to search for handoff candidate. When location is not used to determine whether the mobile terminal should participate in a handoff, the steps of determining the location of the mobile terminal and whether the mobile terminal should participate in a handoff can be reversed. For example, when the signal strength is used to determine whether the mobile terminal should participate in a handoff, the signal strength can be measured and used to determine if there is a need for a handoff either before or after the location of the mobile terminal is determined.

Additionally, in the illustrative embodiment the RF call trace data measurements are preferably taken at certain intervals of distance and the latitude and longitude coordinates of the locations where the measurements are taken are correlated with information in the database. In an alternative embodiment of the invention, the adjacent measured locations can be used to generate geographic areas, i.e. zones, each of which is correlated to the analysis of the measurements at all the locations within the zone. The actual location of the mobile terminal is determined and the zone in which the actual location is located is accessed.

Moreover, in the illustrative embodiment, when the actual location of the mobile terminal is not at one of the stored locations in one of the indexes, then the closest location to the actual location is accessed in the index. In an alternative embodiment of the invention, when the actual location of the mobile terminal is not at of the stored locations then several of the stored locations can be accessed and the information correlated to these locations analyzed to determine whether there should be a handoff, and/or the candidate receiver, and/or the characteristics of the candidate transceiver. For example, the three closest locations to the actual location can be accessed and the candidate receiver would be the candidate receiver corresponding to a majority of the three locations.

Additionally, one skilled in the art will recognize that although in the illustrative embodiment each cell is an omni sector, the cell can be divided into a plurality of sectors, with each sector having its own antennas and radios. Each of the radios has a receiver and transmitter.

While the invention has been described with reference to a preferred embodiment, it will be understood by those skilled in the art having reference to the specification and drawings that various modifications and alternatives are possible therein without departing from the spirit and scope of the invention.

We claim:

1. A method for use in a transfer of communication of a mobile terminal that is in communication with a first transceiver in a first communication system to a second transceiver in a second communication system, wherein the first communication system complies with a first communication standard, and the second communication system complies with a second communication standard, the method comprising the step of:

providing the mobile terminal at least one characteristic of the second transceiver as a function of the location of the mobile terminal;

accessing an index using the second transceiver, the index correlating the second transceiver and the at least one characteristic of the second transceiver;

obtaining the at least one characteristic from the index; and providing the at least one characteristic to the mobile terminal.

2. The method of claim 1, further comprising the steps of:

determining the location of the mobile terminal in communication with the first transceiver; and determining whether the mobile terminal should participate in a handoff.

3. The method of claim 1, wherein the step of determining whether the mobile terminal should participate in the handoff comprises the step of determining whether the mobile terminal should participate in the handoff based on the location of the mobile terminal.

4. The method of claim 1, wherein the step of determining whether the mobile terminal should participate in the handoff comprises the step of determining whether the mobile terminal should participate in the handoff based on a signal strength of a signal received by the mobile terminal.

5. The method of claim 1, wherein the step of determining the location of the mobile terminal comprises determining the location of the mobile terminal in latitude and longitude.

6. The method of claim 1, wherein the step of determining the location of the mobile terminal comprises the step of determining the location of the mobile terminal using wireless assisted global position system.

7. The method of claim 1, wherein the step of determining the location of a mobile terminal comprises the step of determining the location of the mobile terminal using triangulation.

8. The method of claim 1, further comprising the step of handing off the mobile terminal to the second transceiver.

9. The method of claim 1, wherein the providing step comprises the steps of:

accessing an index using the location of the mobile terminal, the index correlating the location and the at least one characteristic of the second transceiver;

obtaining the at least one characteristic from the index; and providing the at least one characteristic to the mobile terminal.

10. The method of claim 9, wherein the index comprises a database.

11. The method of claim 1, wherein the providing step comprises the step of:

accessing an index using the location of the mobile terminal, the index correlating the location and the second transceiver for participating in the handoff with the first transceiver; and obtaining the second transceiver for participation in the handoff from the index.

12. The method of claim 1, wherein the first standard is a CDMA standard and the second standard is AMPS.

13. The method of claim 1, wherein the first standard is IS-95 CDMA and the second standard is a wideband CDMA standard.

14. The method of claim 1, wherein the first standard is a CDMA standard and the second standard is a TDMA standard.

15. The method of claim 1, wherein the first standard is a CDMA standard and the second standard is a GSM standard.

16. The method of claim 1, wherein the first standard is a GSM standard and the second standard is a TDMA standard.

17. The method of claim 1, wherein the first standard is a GSM standard and the second standard is an AMPS standard.

18. A method for use in a transfer of communication of a mobile terminal that is in communication with a first transceiver in a first communication system to a second transceiver in a second communication system, wherein the first communication system complies with a first communication standard, and the second communication system complies with a second communication standard, the method comprising the step of:

providing the mobile terminal at least one characteristic of the second transceiver as a function of the location of the mobile terminal;

handing off the mobile terminal to the second transceiver;

performing measurements of second communication system using the second transceiver;

handing off the mobile terminal to the first transceiver;

identifying an optimal transceiver for participation in the handoff of the mobile terminal based on the measurements of the second communication system; and handing off the mobile terminal to the optimal transceiver.

19. A method for use in a transfer of communication of a mobile terminal that is in communication with a first transceiver in a first communication system to a second transceiver in a second communication system, wherein the first communication system operates in a first frequency band assigned to a first geographic area, and the second communication system operates in a second frequency band assigned to a second geographic area, the method comprising the step of:

provizing the mobile terminal at least one characteristic of the second transceiver as a function of the location of the mobile terminal;

accessing an index using the second transceiver, the index correlating the second transceiver and the at least one characteristic of the second transceiver;

obtaining the at least one characteristic from the index; and providing the at least one characteristic to the mobile terminal.

20. The method of claim 19, wherein the providing step comprises the steps of:

accessing an index using the location of the mobile terminal, the index correlating the location and the at least one characteristic of the second transceiver;

obtaining the at least one characteristic from the index; and providing the at least one characteristic to the mobile terminal.

21. The method of claim 20, wherein the index comprises a database.

22. The method of claim 19, wherein the providing step comprises the steps of:

accessing an index using the location of the mobile terminal, the index correlating the location and the second transceiver for participating in the handoff with the first transceiver; and obtaining the second transceiver for participation in the handoff from the index.

23. The method of claim 19 further comprising the steps of:

determining the location of the mobile terminal in communication with the first transceiver; and determining whether the mobile terminal should participate in the handoff.

24. A method for use in a transfer of communication of a mobile terminal that is in communication with a first transceiver in a first communication system to a second transceiver in a second communication system, wherein the first communication system operates in a first frequency band assigned to a first geographic area, and the second communication system operates in a second frequency band assigned to a second geographic area, the method comprising the step of:

providing the mobile terminal at least one characteristic of the second transceiver as a function of the location of the mobile terminal;

handing off the mobile terminal to the second transceiver;

performing measurements of second communication system using the second transceiver;

handing off the mobile terminal to the first transceiver;

identifying an optimal transceiver for participation in the handoff of the mobile terminal based on the measurements of the second communication system; and handing off the mobile terminal to the optimal transceiver.

* * * * *